United States Patent
Cadden

(10) Patent No.: US 7,286,559 B2
(45) Date of Patent: *Oct. 23, 2007

(54) TECHNIQUE FOR CONTROLLING SELECTION OF A PEEK ADAPTER OR A READ ADAPTER FROM MULTIPLE ADAPTERS CONNECTED TO A HIGH SPEED SWITCH

(75) Inventor: William S. Cadden, Saugerties, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/457,583

(22) Filed: Jul. 14, 2006

(65) Prior Publication Data

US 2006/0250952 A1    Nov. 9, 2006

Related U.S. Application Data

(63) Continuation of application No. 10/156,377, filed on May 28, 2002, now Pat. No. 7,177,322.

(51) Int. Cl.
*H04J 3/16* (2006.01)

(52) U.S. Cl. ........................................ 370/465; 709/202
(58) Field of Classification Search ...................... None
See application file for complete search history.

(56) References Cited

U.S. PATENT DOCUMENTS

| | | | |
|---|---|---|---|
| 4,208,715 A | 6/1980 | Kumahara et al. .......... | 364/200 |
| 4,748,617 A | 5/1988 | Drewlo ........................ | 370/85 |
| 5,051,985 A | 9/1991 | Cidon et al. ........... | 370/85.005 |
| RE34,528 E | 2/1994 | Franaszek .............. | 340/825.79 |
| 5,289,579 A | 2/1994 | Punj ........................... | 395/200 |
| 5,341,475 A | 8/1994 | Austruy et al. .............. | 395/200 |
| 5,432,910 A | 7/1995 | Barker et al. ................ | 395/275 |
| 5,517,662 A | 5/1996 | Coleman et al. ............ | 395/800 |
| 5,592,625 A | 1/1997 | Sandberg ............... | 395/200.08 |
| 5,604,866 A | 2/1997 | Kolb et al. ............ | 395/200.13 |
| 5,617,547 A | 4/1997 | Feeney et al. .............. | 395/311 |
| 5,634,015 A | 5/1997 | Chang et al. ................ | 395/309 |
| 5,659,794 A | 8/1997 | Caldarale et al. ........... | 395/821 |
| 5,710,944 A | 1/1998 | Rosen et al. ................ | 395/875 |

(Continued)

FOREIGN PATENT DOCUMENTS

EP    0 982 898 A1    8/1998

*Primary Examiner*—Phirin Sam
(74) *Attorney, Agent, or Firm*—Geraldine Monteleone, Esq.; Kevin P. Radigan, Esq.; Heslin Rothenberg Farley & Mesiti, P.C.

(57) ABSTRACT

A technique is provided for facilitating peeking and reading of messages from multiple adapters connected, for example, to a high speed switch in a distributed computing environment. The technique employs a first, relatively quick filter to initially test whether a previously used adapter of the multiple adapters should be used to peek or read a new message. If the first filter fails to select the previously used adapter, then the technique includes employing a second, more complicated filter to determine which adapter of the multiple adapters should be used to peek or read the next message. The first filter includes a first set of tests, and the second filter includes a second set of tests.

20 Claims, 10 Drawing Sheets

U.S. PATENT DOCUMENTS

| | | | |
|---|---|---|---|
| 5,721,871 A | 2/1998 | Ginsberg et al. | 395/479 |
| 5,867,677 A | 2/1999 | Tsukamoto | 395/311 |
| 6,047,113 A | 4/2000 | Olnowich | 395/200.51 |
| 6,072,781 A | 6/2000 | Feeney et al. | 370/282 |
| 6,098,123 A | 8/2000 | Olnowich | 710/41 |
| 6,112,252 A | 8/2000 | Hausman et al. | 709/250 |
| 6,233,643 B1 | 5/2001 | Andrews et al. | 710/131 |
| 6,307,858 B1 | 10/2001 | Mizukoshi et al. | 370/395.71 |
| 6,321,259 B1 * | 11/2001 | Ouellette et al. | 709/220 |
| 6,424,632 B1 * | 7/2002 | Poret et al. | 370/395.3 |
| 6,539,021 B1 * | 3/2003 | Kennelly et al. | 370/401 |
| 6,907,001 B1 | 6/2005 | Nakayama et al. | 370/230 |
| 7,177,322 B2 * | 2/2007 | Cadden | 370/465 |
| 2003/0223440 A1 | 12/2003 | Cadden | 370/411 |

* cited by examiner

TECHNIQUE FOR CONTROLLING SELECTION OF A PEEK ADAPTER OR A READ ADAPTER FROM MULTIPLE ADAPTERS CONNECTED TO A HIGH SPEED SWITCH

CROSS-REFERENCE TO RELATED APPLICATION

This application is a continuation of U.S. patent application Ser. No. 10/156,377, filed May 28, 2002, now U.S. Pat. No. 7,177,322 and published on Dec. 4, 2003 as U.S. Patent Publication No. U.S. 2003/0225819 A1, entitled "Technique for Controlling Selection of a Peek Adapter or a Read Adapter from Multiple Adapters Connected to a High Speed Switch", by William S. Cadden, the entirety of which is hereby incorporated herein by reference. Further, this application contains subject matter which is related to the subject matter of the following application, which is assigned to the same assignee as this application and which is hereby incorporated herein by reference in its entirety:

"Technique for Controlling Selection of a Write Adapter from Multiple Adapters Connected to a High Speed Switch", by William S. Cadden, Ser. No. 10/156,554, filed May 28, 2002, and published on Dec. 4, 2003 as U.S. Patent Publication No. U.S. 2003/0223440 A1.

TECHNICAL FIELD

This invention relates in general to a distributed computer system having a plurality of data processing nodes and one or more switch units which establish links between the plurality of processing nodes, and more particularly, to a technique for controlling selection of an adapter, from multiple adapters, for viewing or reading a message in an associated buffer in order to enhance overall message processing performance.

BACKGROUND OF THE INVENTION

In certain parallel processing systems containing a plurality of data processing nodes, one or more switch units are provided for transferring data between the data processing nodes. A switch unit receives a connection request from one of a plurality of nodes and establishes a link between the data processing node which sends the connection request, and another of the plurality of data processing nodes, which is requested by the connection request. As used herein, a "switch node" means any node of the plurality of data processing nodes which is capable of connecting to such a switch unit. A switch node includes a device driver and at least one adapter.

More particularly, described herein is a control technique for a switch node having multiple adapters. Advantageously, multiple adapters are assumed to receive data for reading at a faster rate than a single adapter. However, it is recognized herein that a need exists in the art for a control technique for enhancing the process of switching between adapters during the peeking and reading of messages. The present invention provides such a selection control technique.

SUMMARY OF THE INVENTION

Although multiple adapters are assumed to facilitate the reading of data faster than a single adapter, it has been discovered by applicants that this is not always the case. If the speed at which the data can be read is limited by the path length of the computer program, multiple adapters can actually slow down the reading of data, i.e., the increased path length for switching between adapters slows down the application. This can create a situation where applications actually run slower on multiple adapters than on one adapter. Thus, it has been discovered that a need exists for an effective technique for controlling switching between adapters. This control technique should benefit applications that read more data than one adapter can provide by allowing those applications to use multiple adapters, while at the same time not penalizing applications that do not read data faster than one adapter can provide.

In view of the above, provided herein in one aspect is a method of selecting an adapter of multiple adapters of a switch node for peeking or reading of a new message. The method includes: employing a first filter to initially test whether a previously used adapter of the multiple adapters should be used to read a next message; and if the first filter fails to select the previously used adapter, then employing a second filter to determine which adapter of the multiple adapters should be used to read the next message. In one embodiment, the second filter is more complicated and time consuming than the first filter.

The first filter may comprise a first test set including at least one of: determining whether a read is pending indicative that the next message in the previously used adapter has been peeked at; or determining that each of the following conditions is true: a message is available in the previously used adapter, a switch count indicates that the next message should be received from the previously used adapter, and the previously used adapter is currently operational.

Systems and computer program products corresponding to the above-summarized methods are also described and claimed herein.

In one aspect, presented herein is a technique for facilitating reading of messages from multiple adapters connected to a high speed switch in a distributed computing environment. The technique, which employs minimizing overhead in switching between adapters in order to enhance performance, can be utilized in a program interface that allows application programs to read from multiple adapters with the same interface used to read from one adapter.

Disclosed herein is an effective technique for switching between adapters which benefits applications that read more data than one adapter can handle by allowing those applications to use multiple adapters, while at the same time not penalizing applications that do not read faster than one adapter can handle. This is accomplished by limiting the path lengths for switching between adapters to the point where no application suffers by using multiple adapters, and many applications benefit. Using the technique presented herein, applications can use multiple adapters expecting to perform at the same or greater speed than possible using a single adapter.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
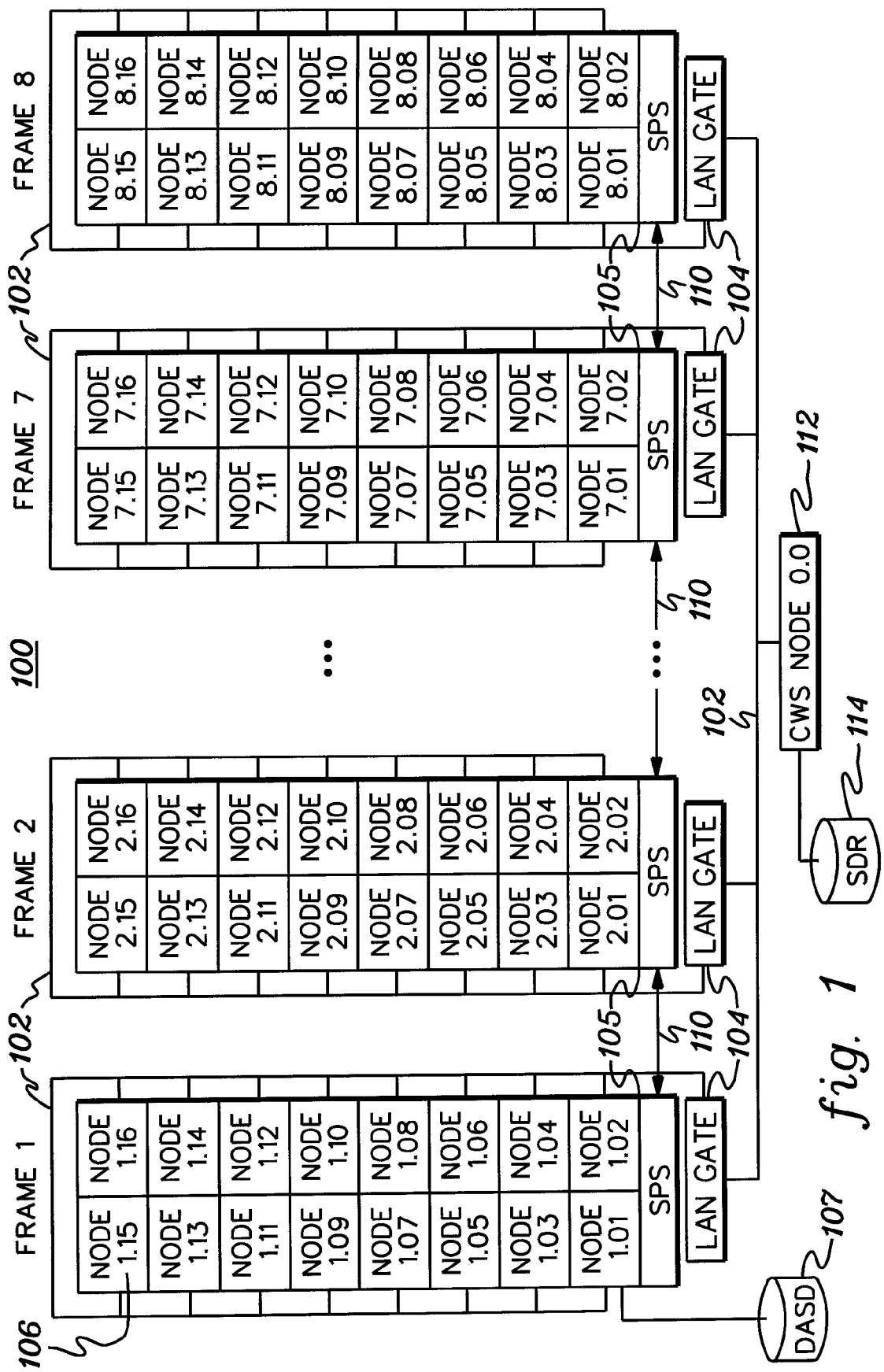
FIG. 1 depicts one example of a distributed communications environment incorporating and using one or more aspects of the present invention.

FIG. 1 is a schematic diagram of a distributed computer system 100 incorporating and using aspects of the present invention. As one example, the distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computing environment having a total of 8 frames, with each frame having up to 16 processing nodes, for a total of 128 nodes. All of the nodes 106 are joined by a local area network (LAN) 102. Each processing node 106 is a computer itself, and may (for instance) be a RISC System/6000 computer running AIX, a UNIX based operating system well- known by those skilled in the art.

All of the nodes in a frame of the SP computer 100 are included in a LAN segment which is joined by the other LAN segments through LAN gates 104. As examples, each LAN gate 104 includes either a RISC/6000 computer, any computer network connected to the LAN or a network router. However, these are only examples. It will be apparent to those skilled in the art that there are other types of LAN gates and that other mechanisms can be used to couple the frames to one another.

Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As is well understood in the art, the CWS node 112 sends system data and control signals to the frames of the SP computer 100 by means of the LAN 102, while messages and data may be sent from one to another of the nods 106 by means of the high performance switches 105.

The distributed computing environment of FIG. 1 is only one example. It is possible to have more or less than 8 frames, or more or less than 16 nodes per frame. Further, the processing nodes do not have to be RISC/6000 computers running AIX. Some or all of the processing nodes can include different types of computers and/or different operating systems. Further, aspects of the invention are usable with other types of communications environments. All of these variations are considered a part of the claimed invention.

Figure 2:
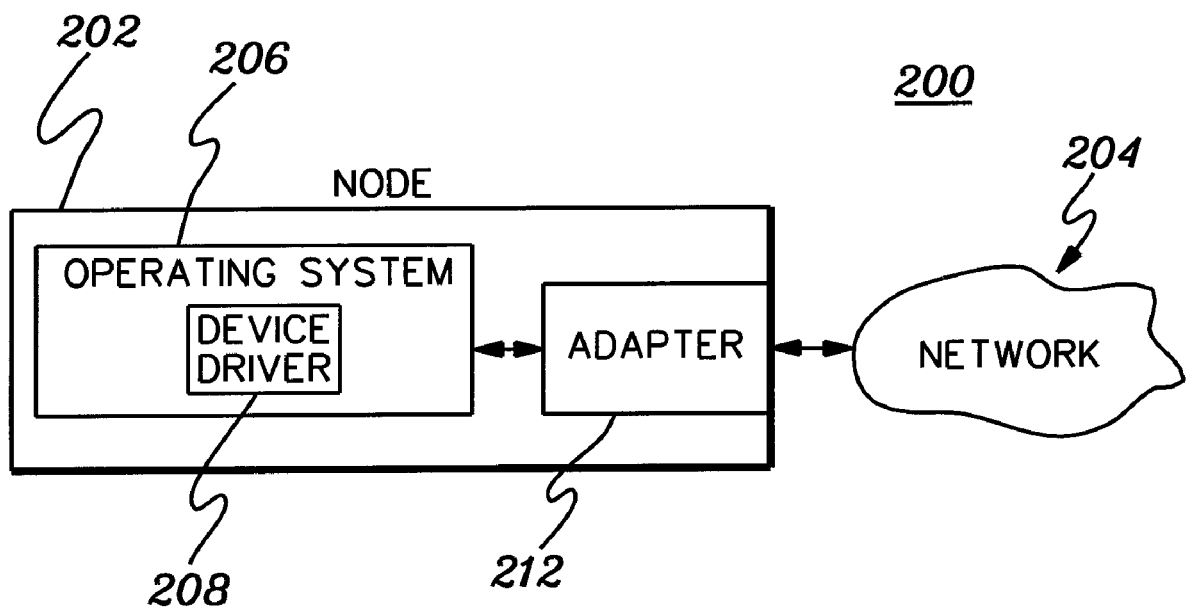
FIG. 2 depicts further details regarding a node of the distributed communications environment of FIG. 1.

FIG. 2 depicts a more detailed embodiment of a node of a computing environment such as depicted in FIG. 1. Environment 200 includes, for instance, a node 202 coupled to one or more networks 204. Although one node and one network are illustrated, it is well known that a computing environment can include many nodes and networks such as described above in connection with FIG. 1. Further, a particular node can be coupled to one or more other nodes via one network type, and further coupled to one or more other nodes via another network type, etc.

A node 202 includes an operating system 206, such as AIX. Operating system 206 includes, for instance, at least one communication device driver 208. The device driver is based on the type of adapter in the environment, such as SP switch-2, and it may manage one or more adapters 212.

Each network adapter is used to couple its associated node to a particular network, which corresponds to that adapter type. Network 204 includes any IP capable network, such as the Ethernet, Token Ring, FDDI, ATM, SP Switch, Fiber Channel, etc.

Before discussing particular adapter processing embodiments in accordance with the present invention, various concepts thereof are explained below.

The present invention works with adapters (e.g., adapter 212 of FIG. 2) that connect computer hardware to, for example, a high speed network or switch. The configuration may have the following qualities.

The adapter can be on a high performance connection to other machines, for example, a connection on a high speed switch. In one aspect, the present invention can be used to insure that the high performance of the connection is not lost through the path length of switching between adapters.

The adapters are assumed to have a method of storing messages that are going to be read, for example, in a first-in first-out queue (referred to as the FIFO). For simplicity in describing certain concepts of the present invention, the example of a FIFO with a head of FIFO pointer and tail of FIFO pointer is used.

Obtaining information from an adapter may be a slower operation than obtaining information from main computer storage. For example, obtaining the head of FIFO and tail of FIFO pointers from the adapter may be a slow operation.

It is possible to "peek" at a next message in the FIFO. When a peek operation is performed, a certain amount of data is read from the message, but the message remains in the FIFO.

An adapter may go down at any point while reading from it. When an adapter goes down, an interrupt is assumed to be generated for the application indicating that the adapter has gone down. When the adapter is down, if a message has been "peeked" at, as noted above, that message can still be read from the FIFO. This is necessary because once the application peeks at a message, it must be able to read the same message. The adapter may then come up again at any point, generating another interrupt.

In order to read from a single adapter, a check is made that the adapter is up and that there is a message in its associated FIFO. If both conditions are true, the message can be peeked at or read from the adapter. Pseudocode for this operation is shown below.

```
If the adapter is up {
  If there are messages in the adapter FIFO {
    read from the FIFO;
  }
}
```

The process becomes more complicated when multiple adapters are considered.

Figure 3:
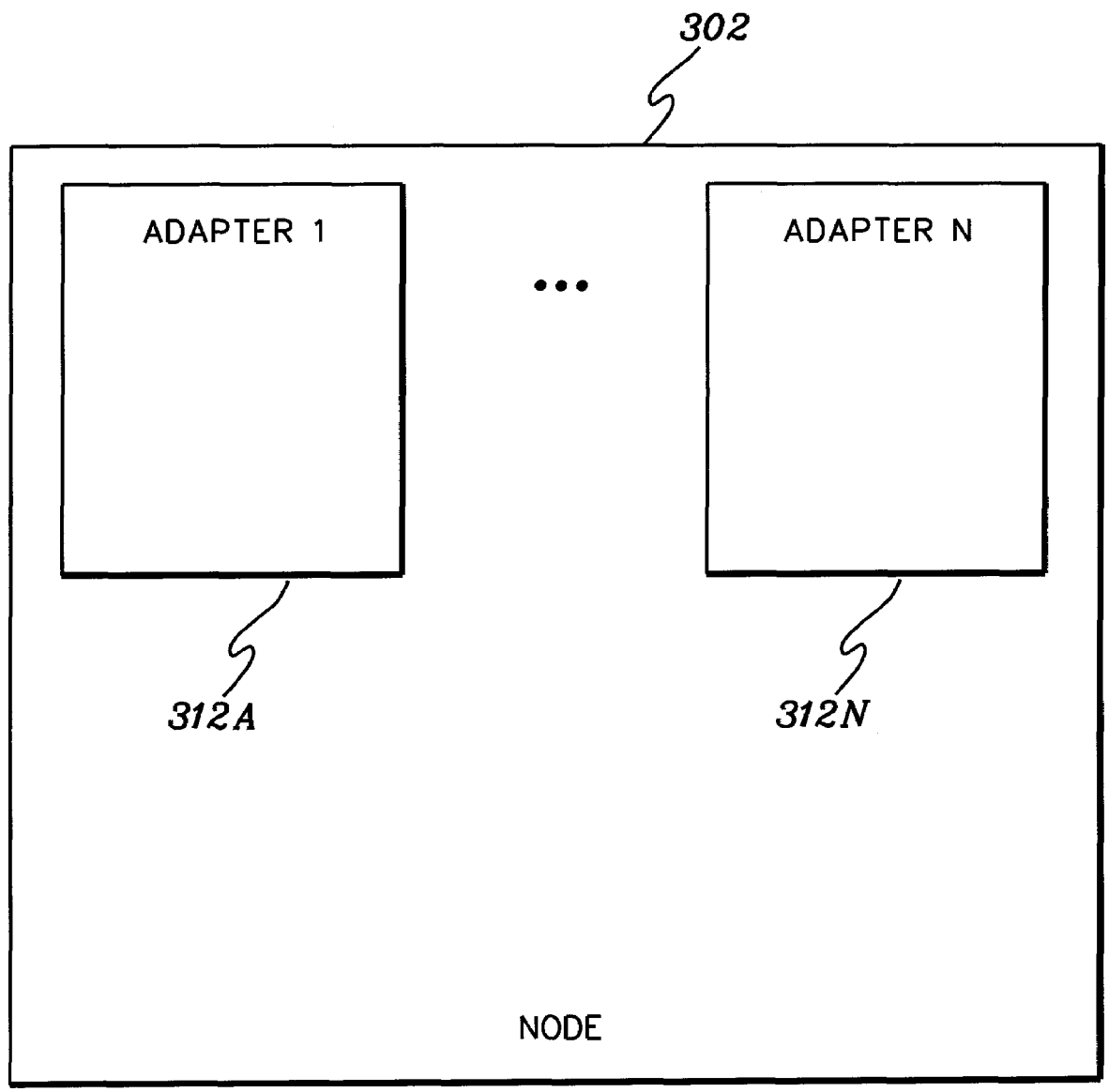
FIG. 3 depicts one embodiment of a switch node having N adapters to be used in reading messages, in accordance with an aspect of the present invention.

FIG. 3 depicts one embodiment of a computing node 302 having multiple adapters 312A . . . 312N . . . , for example, for coupling the node to a high speed switch. When more than one adapter is used, the concept of a switch_count is introduced. The switch_count is an integer value that indicates that after a certain number of messages have been read from one adapter (switch_count messages), a switch is made to another adapter before reading a next message. Preferably, a switch_count number of messages are read from this other adapter before switching to yet another adapter.

There are other times when a switch will be made between adapters. If there are no messages available on one adapter, then a switch is made to another ever if switch_count messages have not been read. In addition, if an adapter goes down, a switch is made to an adapter that is up.

When a message is peeked at, provision is made to ensure that the next message that is read is the one that was peeked at. Once a peek has taken place, a switch to another adapter cannot be made until the message has been read.

The concept of a significant_difference_number is also employed representative of the difference between the number of messages in one adapter FIFO versus other adapter FIFOs. The significant_difference_number can be set to be any number desired, and it indicates that if some adapter FIFO has more than significant_difference_number of messages than other adapter FIFOs, messages should be read from the FIFO with the greater number of messages. For example, if the significant_difference_number is 512, and certain FIFOs have 600 messages while others have 12 messages, most messages should be read from the FIFOs with 600 messages. It is assumed that the FIFOs with greater number of messages are receiving messages faster than the other FIFOs and thus should be read from more rapidly.

However, the FIFOs with less messages are not ignored altogether. If only the FIFOs with the greater number of messages were read, it would be possible to end up with a situation where FIFOs containing a great deal of entries are constantly read, while the less full FIFOs are completely ignored. Thus, when certain FIFOs contain significantly more messages than others, a few messages are read from the less full FIFOs, and then a switch back is made to the more full FIFOs where many messages may be read.

When a message is read from an adapter, there are generally two steps. A first is to peek at the message in order to extract header information. The header information lets the program know why the message is being received and where it should be stored. Using the header information, the program then knows how to handle the second step, which is to read the message.

Pseudocode for peeking at a message when two adapters are used is shown below.

```
If the switch_count indicates we should try to read from the previous
adapter {
  If the previous adapter is up {
    If there are message in the previous adapter fifo {
      peek from the previous adapter;
    }
  }
}
If we did not successfully peek from the previous adapter {
  If the other adapter is up {
    If there are messages in the other adapter fifo {
      peek from the other adapter;
    }
  }
}
```

Pseudocode for reading a message when two adapters are used is shown below.

```
If the switch_count indicates we should try to read from the previous
adapter {
  If the previous adapter is up or if we previously peeked from the previous
  adapter {
    If there are message in the previous adapter fifo {
      read from the previous adapter;
    }
  }
}
If we did not successfully read from the previous adapter and we did not
previously peek from it {
  If the other adapter is up {
    If there are messages in the other adapter fifo {
      read from other adapter;
    }
  }
}
```

As shown above, there can be quite a few steps to execute when doing a peek into a message and then reading from it using multiple adapters. These steps are executed along critical performance paths and can cause an unacceptable performance slow down compared with the single adapter case. The problem becomes even worse when more than two adapters are used.

The invention presented herein avoids long path lengths by saving state information from previous tests, by taking advantage of the fact that the program is notified in an interrupt or signal handler when the adapter goes down, and by combining several tests into one. The processing discussed below takes advantage of the fact that in most cases the next message is read from the same adapter from which the previous message was read from. This adapter is referred to herein as the "previous adapter" or the "previously used adapter". Those skilled in the art will understand that as used herein the reading of a message from an adapter refers to the reading of the message from a buffer associated with the adapter, as explained further below. For example, if the switch_count is 32, then as long as there are enough messages in the associated FIFO, we will prefer to read 32 messages from the previous adapter before a message is read from another adapter. Thus, one aspect of the present invention is to make the path length of reading from the previous adapter as short as possible, even if that makes the path length for switching between adapters a little longer. The shorter path length will be executed for the large majority of cases, and the longer infrequently. Test processing to determine when the previous adapter is to be employed is referred to herein as the "simple set of tests" or "first set of tests", while test processing employed to select a potentially new adapter is referred to as the "more complicated set of tests" or "second set of tests".

Figure 4:
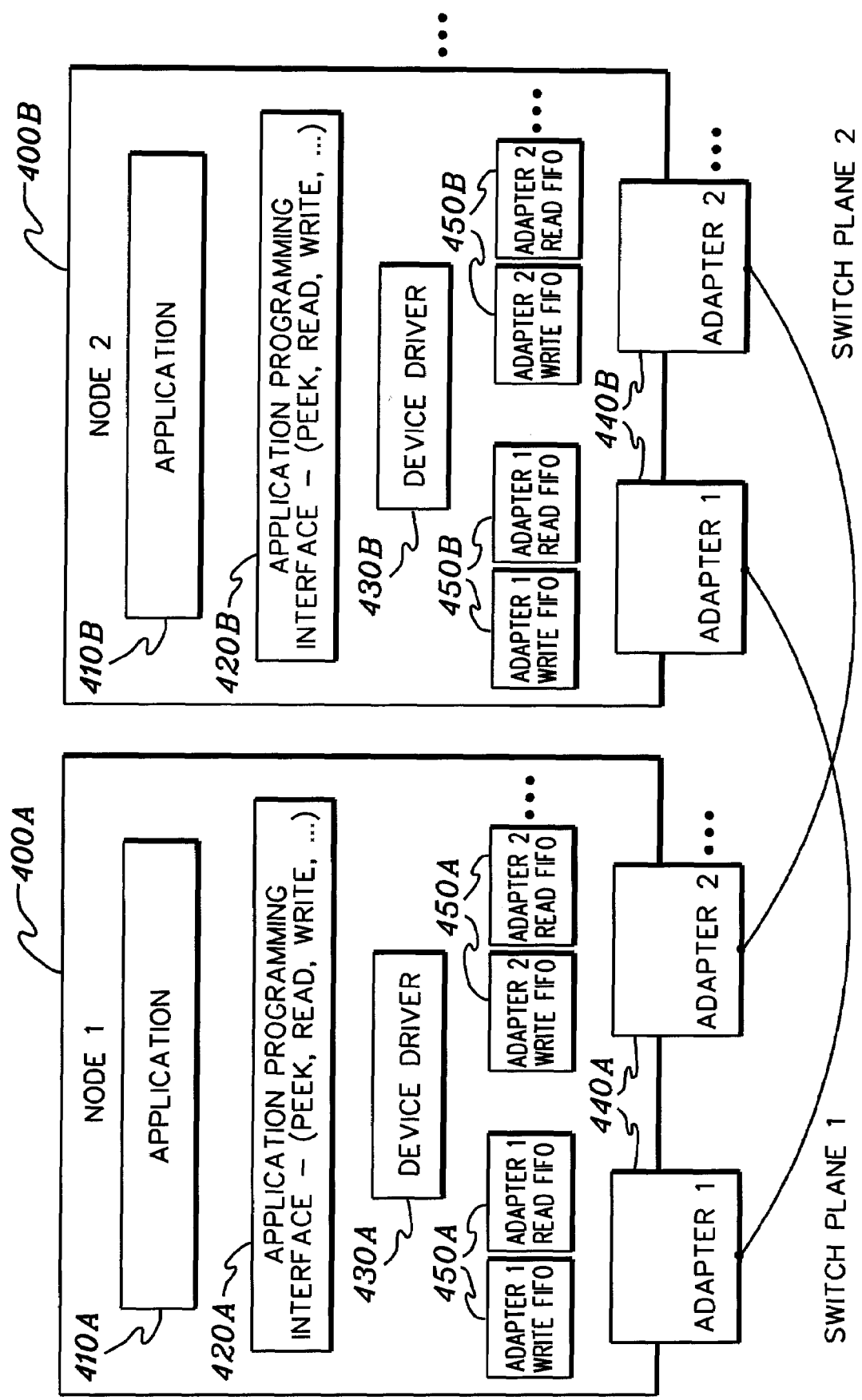
FIG. 4 depicts a more detailed example of one embodiment of a computing environment within which the processing control techniques described herein can be implemented, in accordance with an aspect of the present invention.

Before describing the test processing in detail, the environment of the invention is described in greater detail with reference to the distributed computing environment depicted in FIG. 4. As shown, multiple computing nodes 400A, 400B, . . . each include a portion of an application 410A, 410B, . . . The respective applications employ application programming interfaces (APIs) 420A, 420B, . . . to call particular functions, such as the peek and read functions discussed herein (as well as the write function described in the above-incorporated, co-filed application). The multinode network is connected by multiple high speed switches, such as the RS6000 SP switch marketed by International Business Machines Corporation. The multiple high speed switches define multiple switch planes, e.g., switch plane 1 & switch plane 2. Each computer is connected to the several switches using separate adapters 440A, 440B, . . . Device drivers 430A, 430B, . . . facilitate the reading and writing of messages through the respective adapters.

In the example shown, adapter 1 of each node is connected to switch plane 1, and adapter 2 of each node is connected to switch plane 2. When a message is written from one node to another node, the adapter that the message is sent through determines which adapter the data is received at. A message is received on the same adapter number that the message was sent on. So if a message is sent through adapter 1 on a first computing node, it will travel through switch plane 1 to adapter 1 on a second computing node.

In operation, the portion of the application and program running on a particular computing node writes messages through its respective API to other parts of the application running on other computing nodes. Similarly, the portion of the application on a receiving node reads messages from other parts of the application running on other computer nodes through its API.

Each adapter of each computing node has associated therewith a write FIFO and a read FIFO 450A, 450B, . . . These FIFOs are employed when writing and reading messages through the adapters. When an application writes a message, it calls its associated API to place the message into the write FIFO associated with the selected adapter. This FIFO has a fixed number of slots that can be filled by the API. When the adapter associated with the FIFO ascertains that a message is in the FIFO, the adapter sends the message over the switch plane in a first-in first-out order. If the write FIFO is full, the API detects this and tells the application. The application then waits until the adapter transfers a message out of the FIFO onto the switch before placing a new message into the FIFO. The adapter transfers a message from its associated FIFO onto the switch, and the message travels across the switch to other computing nodes. An adapter on another computing node connected to the particular switch plane receives the message and places it into its associated read FIFO.

The receiving application may then call the API peek function to see a part of the contents of the message in the read FIFO. As noted, a peek operation returns a part of a message without removing the message from the read FIFO. The receiving application may read the rest of the message using the API read function, which then removes the data from the read FIFO. Once the data is removed, the space on the read FIFO is available for a new message.

Within this environment, presented herein are various processing enhancements to facilitate enhanced processing performance of the multiple nodes using multiple adapters and their associated FIFOs. Unless otherwise specified, the adapter FIFO discussed herein refers to an adapter's read FIFO.

One piece of state information which can be saved is the count of how many messages are in the adapter FIFO. From the point of view of the peek and read operations it does not matter if there is one or many messages in the FIFO. If there is at least one message, the message can be peeked at or read. To avoid reading information from the adapter with every message peek or read, a message_count is saved in local storage representative of how many messages are in the FIFO every time this is determined by checking the adapter. This count could be decremented each time the FIFO is read, and indicate that there are at least message_count messages in the FIFO. There may be more, but there are at least that many. The exact number of messages need only be calculated when the message_count is decremented to zero. This improves performance because determining the exact number of messages in the adapter FIFO is a considerably slower operation than decrementing the message_count. Since the exact number of messages does not need to be known, but only whether one or more messages are in the FIFO, time is saved using the message_count variable.

Part of the simple set of tests is to determine if the switch_count or the message_count has reached 0. If either has, we must perform the more complicated set of tests to determine if it is time to switch adapters. In the actual implimentation we do not need to decrement both the switch_count and the message_count every time a message is read. A combined count is employed, called recv_test, that is initialized to the smaller of the switch_count and the message_count. Recv_test is decremented every time a message is read. When it reaches 0, it indicates that either the switch_count or the message_count would have reached 0 if they had been decremented. Using recv_test allows processing to decrement and test only 1 variable instead of two, thus shortening the pathlength of the shorter set of tests.

Another aspect of the present invention is to employ a test pointer to the previous adapter. If the pointer is NULL, it indicates that we may not want to read from the previous adapter and the more complicated set of tests is to be used to determine which adapter to select. If the pointer is not NULL, it indicates that the next message should be read from the previous adapter. This being the case, when the test pointer is not NULL we can determine which adapter to read from using only one test in each of the peek and read operations.

```
Peek Operation:
If the test pointer is not NULL {
  Set up to peek from the previous adapter;
} else {
  Do the more complicated and slower set of tests and set up to peek
  from whichever adapter is appropriate;
}
Peek from the specified adapter;
Read Operation:
If the test pointer is not NULL {
  Set up to read from the previous adapter;
} else {
  Do the more complicated and slower set of tests and set up to read
  from whichever adapter is appropriate;
}
Read from the specified adapter;
```

There are two times when the test pointer is set to NULL. The first is when an indication comes in that the status of one of the adapters has changed (that is an adapter has gone up or down). This is detected in an interrupt handler, and the pointer is set to NULL from that interrupt handler so that the next time a peek or read operation is called the more complicated set of tests will be used. By setting the test pointer from an interrupt handler, we do not add any path length to the main line path of processing messages from the FIFO. If the interrupt occurs between a peek and a read operation the test pointer can not be set to NULL, because the next read must come from the previous adapter. In this case the pointer is set to NULL after the next read. In order to make sure that this is accomplished, recv_test is set to 0, so that after the next read operation it will have a value of 0 or less. Recv_test can be used to signal this because it is already tested after each read operation, and thus we are not adding anything to the simple set of tests in order to check for this condition.

The setting of the test pointer and recv_test in an interrupt handler does cause a timing problem that should be addressed. It is possible for the test pointer and recv_test to be set in the interrupt handler at the same time that they are set in the complicated set of tests. When this occurs we can not be sure whether the value from the interrupt handler or the value from the more complicated set of tests is the one that remains. The interrupt handler could set the test pointer to NULL only to have the more complicated set of tests set it to another value an instant later. In this case, the indication that the more complicated set of tests should be done the next time that peek or read is called would be lost. In order to handle this timing issue, the interrupt handler also sets a flag that indicates the test pointer and recv_test have been set from an interrupt handler. The more complicated set of tests will examine this flag to see if an interrupt occurred while it was setting the test pointer and recv_test, and if it has, the test pointer and recv_test will be set to NULL and 0, respectively. This will cause the more complicated set of tests to be used the next time that peek or read is called, and any effects of the interrupt will be handled.

The second time the test pointer may be set to NULL is immediately after a message has been read. At this point recv_test is decremented. If it is 0, the test pointer is set to NULL, indicating that the more complicated set of tests is to be performed.

Psuedocode for the peek operation and for the read operation is shown below.

```
Peek:
If the test pointer is not NULL {
  Set up to peek from the previous adapter;
} else {
  Do the more complicated set of tests to determine which
    adapter we should peek from. The test pointer is set
    to point to the specified adapter;
}
Peek from the specified adapter;
Read:
If the test pointer is not NULL {
  Set up to read from the previous adapter;
} else {
  Do the more complicated set of tests to determine which
    adapter we should read from. The test pointer is set
    to point to the specified adapter;
}
Read from the specified adapter;
Decrement recv_test;
If (recv_test <= 0) {
  Set the test pointer to NULL so the more complicated set of tests will be
    used;
}
```

Notice that if the previous adapter should be used for the next peek or read is determined with only the additional path length of testing the test pointer, decrementing recv_test, and testing the recv_test.

One embodiment of psuedocode for the more complicated set of tests when two adapters are used is shown below.

```
Calculate the new value of the switch_count based on how
  much recv_test has been decremented;
if there has been a previous peek and we have not yet read
  the packet {
  Set the test pointer to point to the previous adapter;
} else if the previous adapter is down {
  if the other adapter is down {
    Return indicating no messages are available;
  }
  Calculate the message_count for the other adapter;
  if the other adapter has no messages {
    Return indicating no messages are available;
  }
  Set the test pointer to point to the other adapter;
  Set switch_count back to the number of messages that
    should be read before switching to another adapter;
} else {
  Calculate the message_count for the previous adapter;
  if the message_count for the previous adapter is greater
    than 0 and the switch_count is greater than 0 {
    Set the test pointer to point to the previous adapter;
  } else {
    if the other adapter is down {
      if the message_count for the previous adapter is 0 {
        Return indicating no messages are available;
      }
      Set the test pointer to point to the previous adapter;
      Set switch_count back to the number of messages that
        should be read before switching to another adapter;
    } else {
      Calculate the message_count for the other adapter;
      if message_count is 0 on both the previous adapter and
        the other adapter {
        Return indicating no messages are available;
      } else if message_count is 0 on the previous adapter {
        Set the test pointer to point to the other adapter;
        Set switch_count back to the number of messages that
          should be read before switching to another
          adapter;
      } else if message_count is 0 on the other adapter {
        Set the test pointer to point to the previous
          adapter;
        Set switch_count back to the number of messages that
```

```
        should be read before switching to another
          adapter;
    } else if the previous adapter has significantly_more
      messages than the other adapter {
      Set the test pointer to point to the other adapter;
      Set switch_count to a small value so that the
        complicated set of tests will be tried again
        shortly so we can switch back to the more full
        previous adapter;
    } else {
      Set the test pointer to point to the other adapter;
      Set switch_count back to the number of messages that
        should be read before switching to another
        adapter;
      }
    }
  }
}
if the switch_count is less than the message_count {
  Set recv_test to switch_count;
} else {
  Set recv_test to message_count;
}
if a concurrent interrupt has occurred {
  The interrupt may have occurred before we set the test
    pointer above, and so we may have written over what the
    interrupt handler did. Set the test pointer to NULL and
    recv_test to 0; Return a valid pointer however that can
    be used for the current peek or read operation.
    Resetting the test pointer to NULL only affects the next
    peek or read operation;
}
```

If more than two adapters are used, then the more complicated set of tests could be implemented as follows:

```
Calculate the new value of the switch_count based on how
  much recv_test has been decremented;
if there has been a previous peek and we have not yet read
  the packet {
  Set the test pointer to point to the previous adapter;
} else if the previous adapter is down {
  Search the list of adapters to find the next adapter that
    is up and has messages in it;
  if there is no such adapter {
    Return indicating no messages are available;
  }
  Set the test pointer to point to the other adapter;
  Set switch_count back to the number of messages that
    should be read before switching to another adapter;
} else {
  Calculate the message_count for the previous adapter;
  if the message_count for the previous adapter is greater
    than 0 and the switch_count is greater than 0 {
    Set the test pointer to point to the previous adapter;
  } else {
    Search the list of adapters to find the next adapter
      that is up and has messages in it;
    if there is no such adapter {
      if the message_count for the previous adapter is 0 {
        Return indicating no messages are available;
      }
      Set the test pointer to point to the previous adapter;
      Set switch_count back to the number of messages that
        should be read before switching to another adapter;
    } else {
      if there is any adapter that has significantly more
        messages than the selected adapter {
        Set the test pointer to point to the selected
          adapter;
        Set switch_count to a small value so that the
          complicated set of tests will be tried again
          shortly so we can switch to a more full adapter;
      } else {
        Set the test pointer to point to the selected
          adapter;
        Set switch_count back to the number of messages that
          should be read before switching to another
          adapter;
      }
    }
  }
}
if the switch_count is less than the message_count {
  Set recv_test to switch_count;
} else {
  Set recv_test to message_count;
}
if a concurrent interrupt has occurred {
  The interrupt may have occurred before we set the test
    pointer above, and so we may have written over what the
    interrupt handler did. Set the test pointer to NULL and
    recv_test to 0; Return a valid pointer however that can
    be used for the current peek or read operation.
    Resetting the test pointer to NULL only affects the next
    peek or read operation;
}
```

Figure 5:
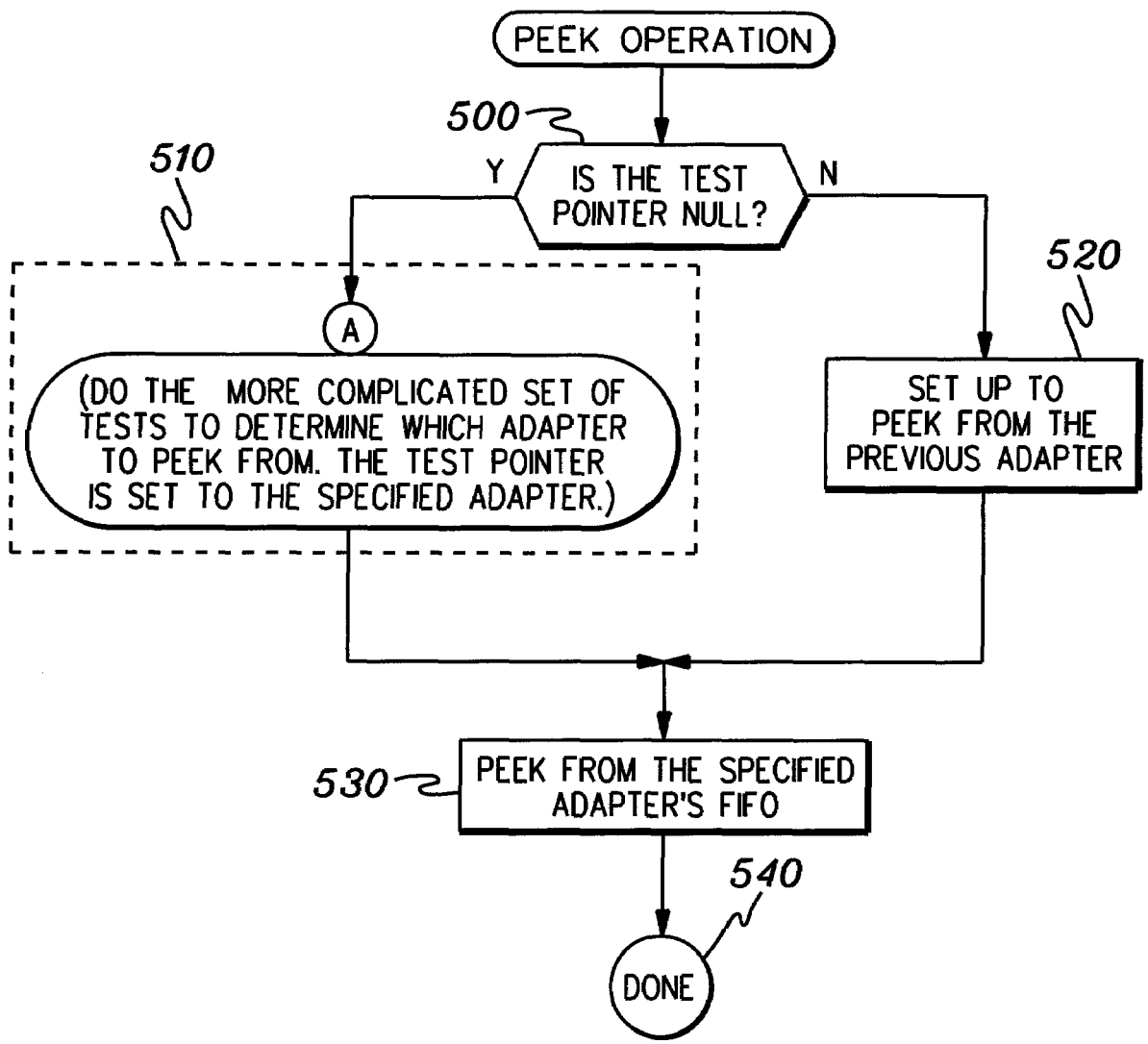
FIG. 5 is a flowchart of one embodiment of a peek operation for controlling selection of a peek adapter using a first filter, in accordance with an aspect of the present invention.
Figure 6:
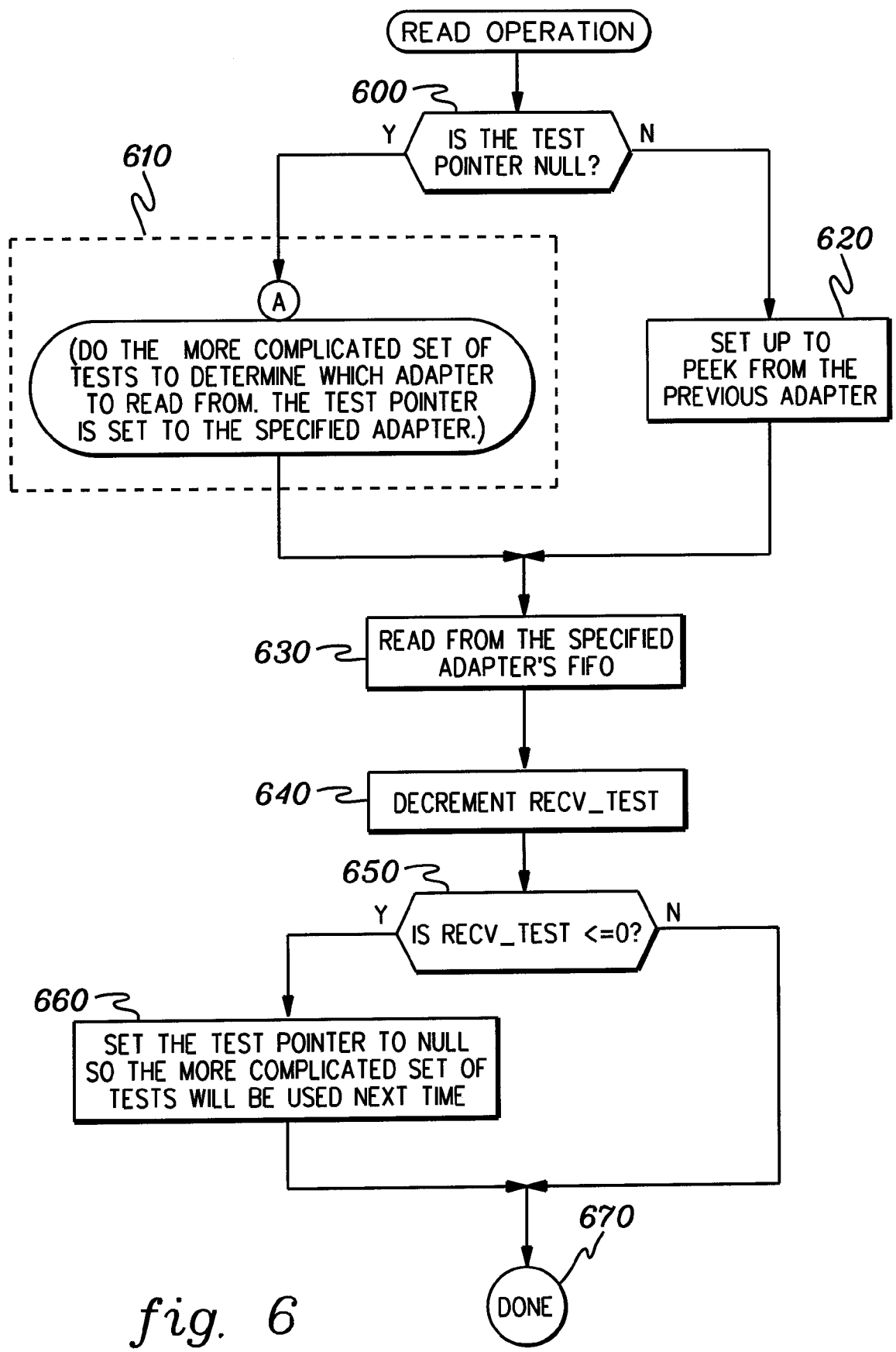
FIG. 6 is a flowchart of one embodiment of a read operation for controlling selection of a read adapter using a first filter, in accordance with an aspect of the present invention.

FIGS. 5-9 depict flowchart embodiments of the pseudocode processings set forth above. Specifically, FIG. 5 is an example of a first or simple set of tests which can be performed for a peek operation, while FIG. 6 represents a first or simple set of tests which can be employed for a read operation. FIGS. 7A-9 represent one embodiment of a more complicated, second set of tests which can be called from the processing of FIG. 5 or FIG. 6 to determine a particular adapter FIFO to be used when performing a peek operation or read operation, in accordance with the present invention.

Beginning with FIG. 5, the first or simple filter for a peek operation initially inquires whether the test pointer is set to NULL 500. If so, then the more complicated set of tests of FIGS. 7A-9 is employed 510, as explained further below. Inquiry 500 represents a quick analysis that is performed with each message peek operation to determine whether the read FIFO associated with the previously used adapter can continue to be used for the new peek operation. As a default, the test pointer could be set to use the previous adapter. The test pointer is set to NULL if any of a group of conditions arises as explained hereinbelow. In such a case, the more complicated set of tests would be employed.

Assuming that the test pointer is set to other than NULL, then processing sets up to peek from the FIFO associated with the previously used adapter 520. Processing then peeks from the specified adapter's FIFO 530, which completes the peek operation 540.

As noted, FIG. 6 depicts one embodiment of processing comprising a first filter of a read operation in accordance with an aspect of the present invention. Similar to the peek operation, this read operation begins by determining whether a test pointer is set to NULL 600. If so, then the more complicated set of tests of FIGS. 7A-9 is called 610. As with the peek operation, this test is performed as a quick analysis to determine whether the read operation can read a message from a FIFO associated with the previously used adapter. As a default, the test pointer could be set to the previously used adapter. The test pointer is set to NULL if any of a group of conditions arises as explained below.

Assuming that the test pointer is set to other than NULL, then processing sets up to read from the previously used adapter 620. Upon completion of processing 610 or processing 620, a message is read from the specified adapter's FIFO 630, and a recv_test variable is decremented 640. This variable is used as a single point of reference to determine whether a next read operation can continue from the FIFO associated with the previously used adapter. Processing then inquires whether recv_test is less than or equal to zero 650. If no, then additional messages can be read from the FIFO associated with the previously used adapter and the read operation is complete 670. Otherwise, processing sets the test pointer to NULL so that the more complicated set of tests of FIGS. 7A-9 will be employed the next time there is a peek or read operation 660, after which processing is complete 670.

Figure 7A:
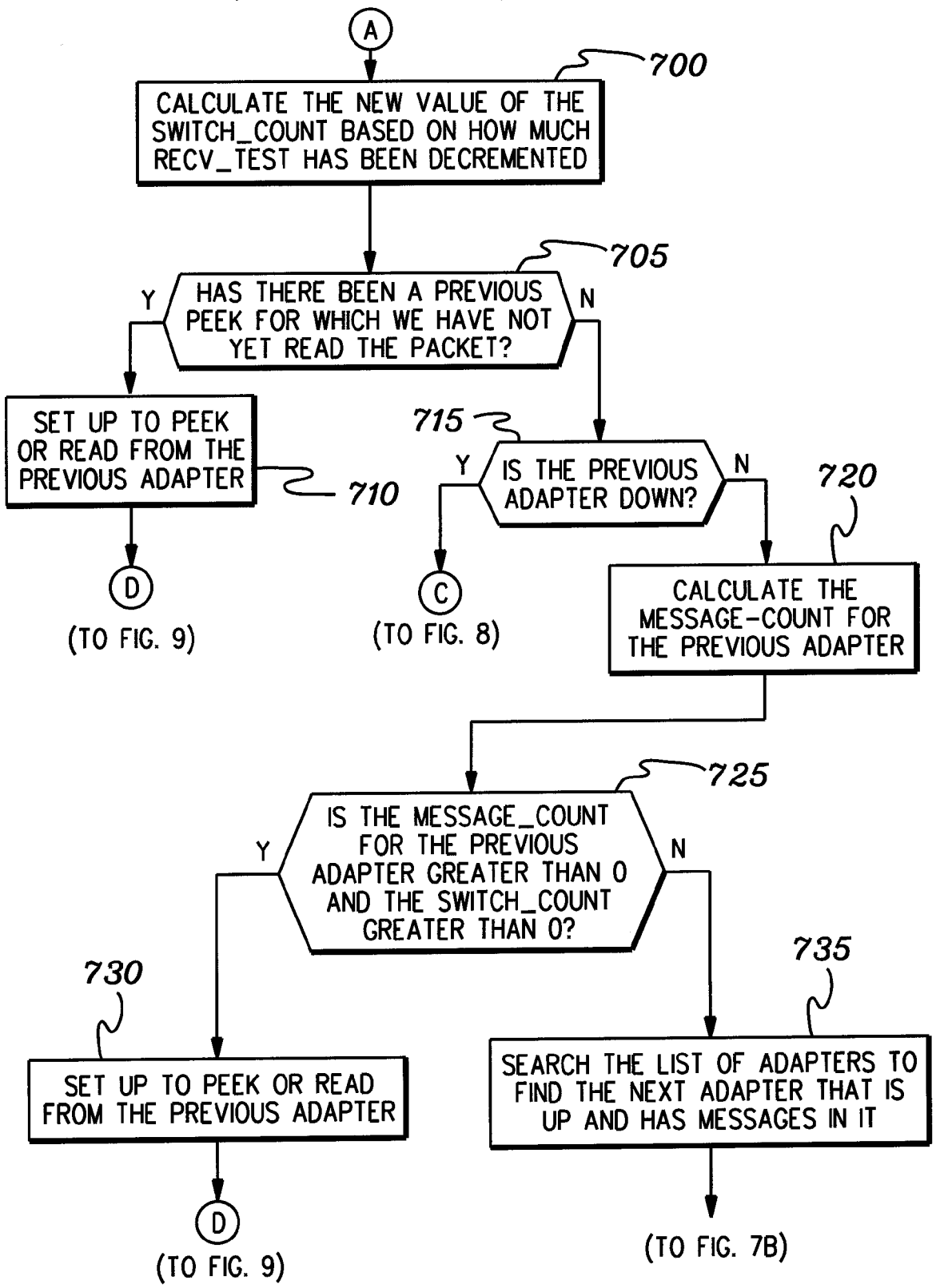
FIGS. 7A & 7B are a flowchart of one embodiment of a more complicated process, employing a second filter, for selecting a peek adapter or a read adapter, wherein the process is conditionally called from the processing of FIG. 5 or FIG. 6, in accordance with an aspect of the present invention.
Figure 7B:
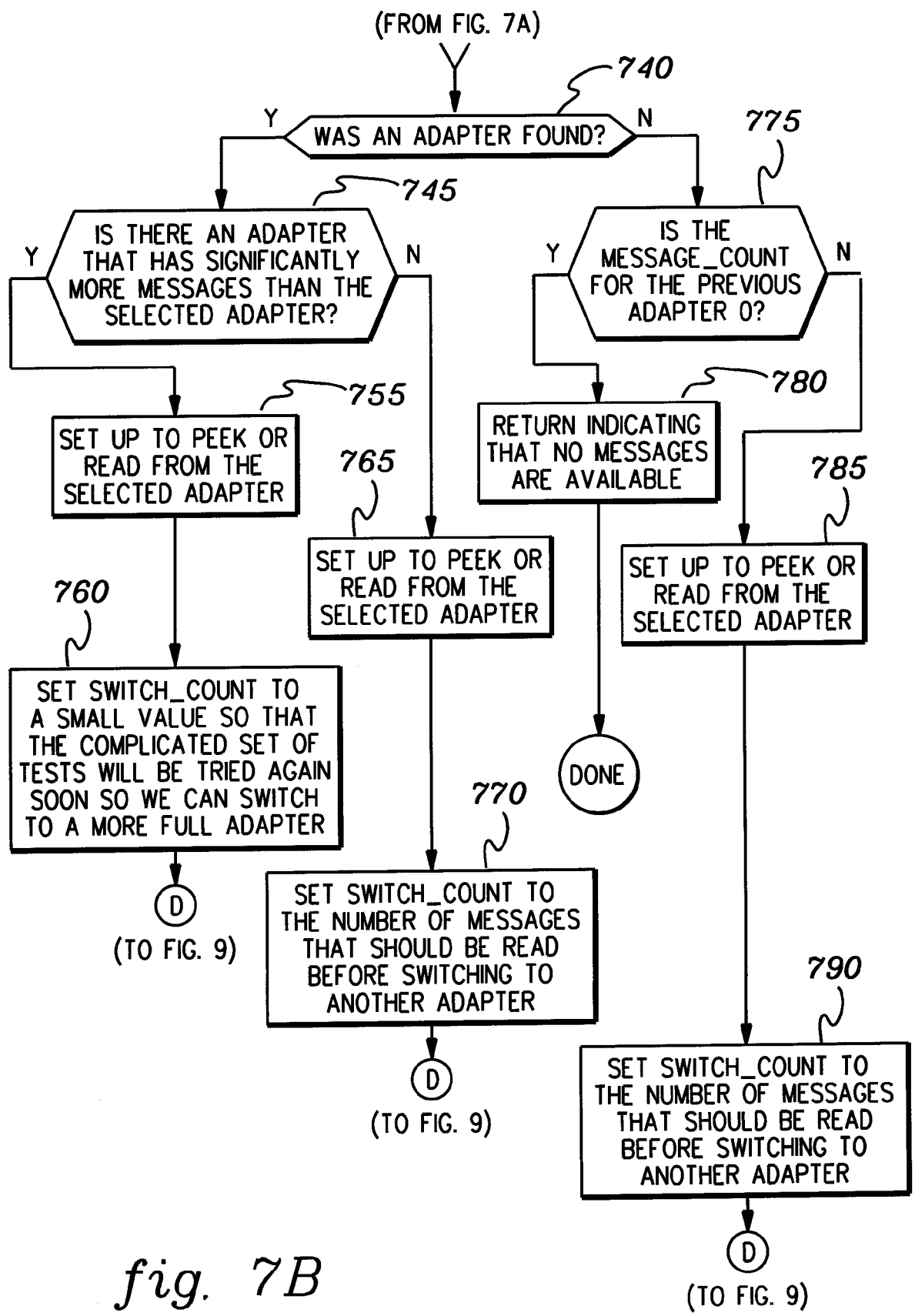
Figure 8:
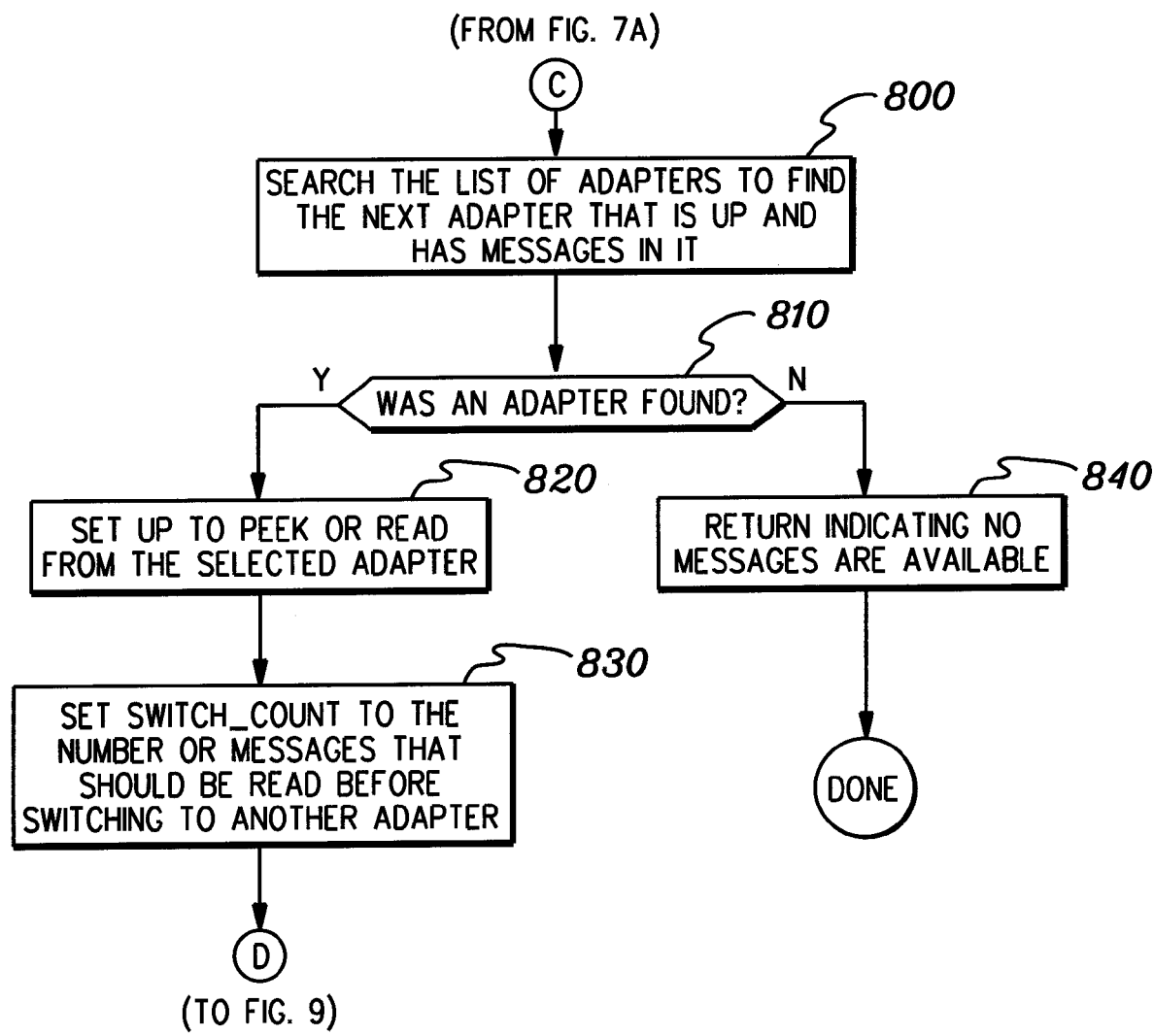
FIG. 8 is a flowchart of one embodiment of processing followed from the processing of FIG. 7A when the previously used adapter is down, in accordance with an aspect of the present invention.
Figure 9:
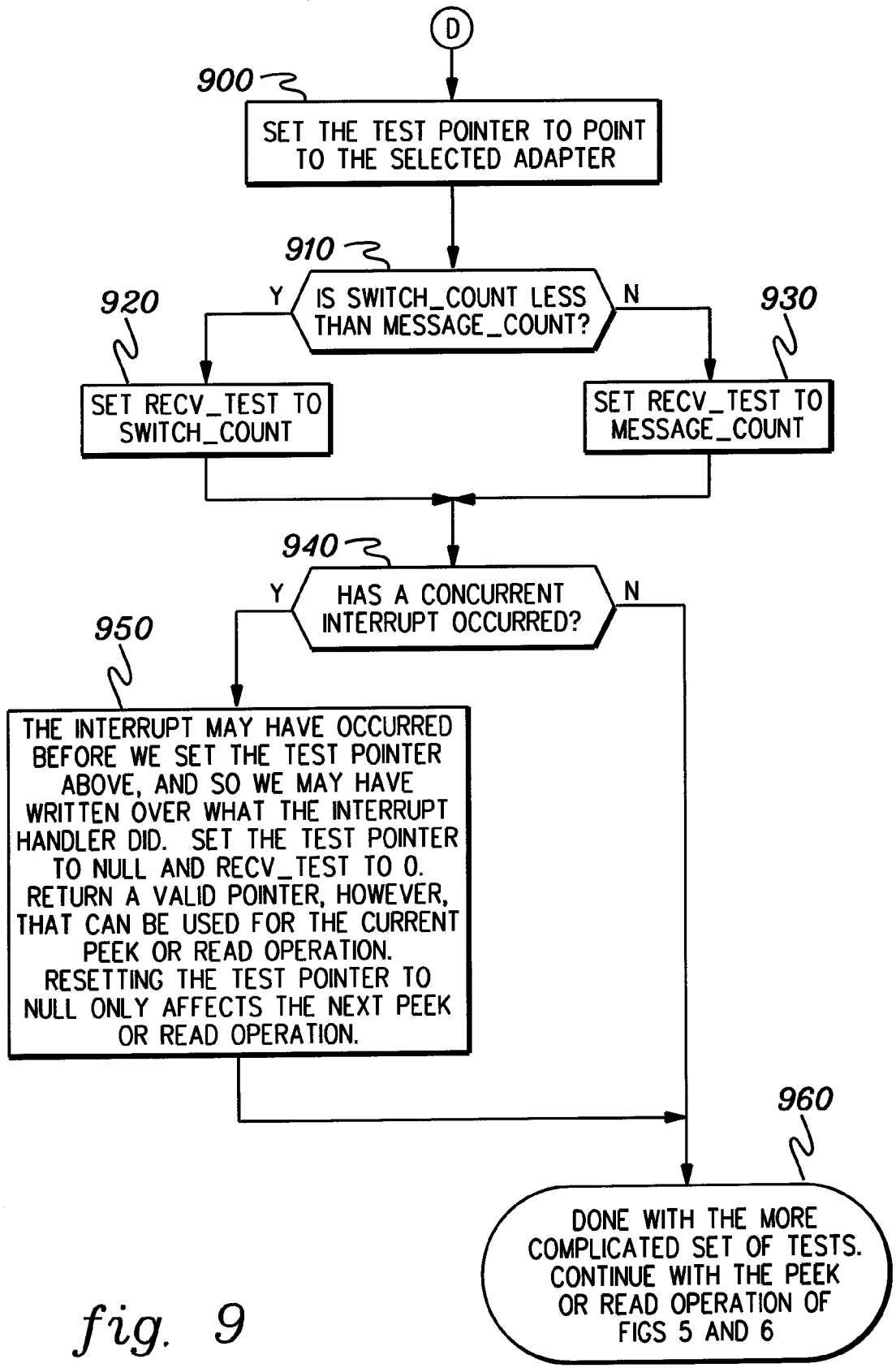
FIG. 9 is a flowchart of one embodiment of processing followed from the processing of FIGS. 7A & 7B for setting a recv_test variable and determining whether an interrupt has occurred, in accordance with an aspect of the present invention.

As noted, the more complicated set of tests, represented in one example by the processing of FIGS. 7A-9, can be called from the processings of FIGS. 5 & 6 when the initial inquiry determines that the test pointer is set to NULL. Beginning with FIGS. 7A & 7B, the more detailed processing initially calculates a new value for switch_count based on how much recv_test has been decremented 700. Processing then determines whether there has been a previous peek operation without the packet having been correspondingly read as yet 705. As noted above, a peek operation precedes a read operation in many implementations. Thus, inquiry 705 ensures that a read operation refers to the same message as a preceding peek operation. There is no switching of a FIFO between a peek operation and a read operation. If there has been a previous peek operation without a corresponding read operation, then processing sets up to peek or read from the previously used adapter's FIFO 710, after which the processing of FIG. 9 is employed as explained further below.

Assuming that the answer from inquiry 705 is no, then processing determines whether the previously used adapter is down 715. If so, then the processing of FIG. 8 is employed. Otherwise, the message_count is determined for the previously used adapter 720, and an inquiry is made whether the message_count for the previously used adapter is greater than zero and the switch_count is greater than zero 725. If so, then processing sets up to peek or read from the FIFO associated with the previously used adapter 730, before following the processing of FIG. 9.

If either message_count or switch_count is equal or less than zero, then processing searches a list of adapters to find a next adapter that is up and has messages in its associated read FIFO 735. The list of adapters could be any list or ordering of adapters desired, for example, a simple listing of adapters from zero to N, where N is the number of possible adapters.

Continuing with the flowchart embodiment of FIG. 7B, processing next determines whether an adapter was found 740. If so, an inquiry is made whether there is an adapter that has significantly more messages than the selected adapter 745. If no, processing sets up to peek or read from the selected adapter 765 and the switch_count variable is set to the number of messages that should be read or peeked before switching to another adapter 770, after which processing continues with the flowchart of FIG. 9. If there is an adapter that has significantly more messages than the selected adapter, then processing sets up to peek or read from the selected adapter 755 and sets switch_count to a small value so that the more complicated set of tests will be employed relatively soon in order to effectuate a switch to reading of messages from the more full adapter 760. Again, once switch_count is set, processing continues with the flowchart of FIG. 9.

If no adapter was found, then from inquiry 740, processing determines whether the message_count for the previous adapter is zero 775. If so, a signal is returned indicating that no messages are currently available 780, after which processing is done. If message_count for the previous adapter is other than zero, then processing sets up to peek or read from the previously used adapter 785, and the switch_count is set to the defined number of messages that should be read before switching to another adapter 790. Once switch_count is set, processing continues with the flowchart of FIG. 9.

As noted, the process of FIG. 8 is followed from the processing of FIG. 7A when it is determined that the previously used adapter is down. FIG. 8 processing flow begins by searching the list of adapters to find a next adapter which is up, and has messages in its associated FIFO 800. Processing then determines whether an adapter was found 810. If no, an indication is returned that no messages are currently available 840, and processing is finished. If an adapter was found, then processing sets up to peek or read a message from the selected adapter's FIFO 820, after which the switch_count is set to the defined number of messages that should be read before switching to another adapter 830, and the processing of FIG. 9 is performed.

FIG. 9, which represents a final clean-up process flow, is performed whenever the more complicated set of tests successfully selects an adapter. Processing initially sets the test pointer to point to the selected adapter 900, and then determines whether switch_count is less than message_count 910. If so, then recv_test is set to switch_count 920. Otherwise, recv_test is set to message_count 930. This processing essentially sets recv_test to the lesser of switch_count and message_count.

Processing next determines whether an interrupt occurred, such that what the interrupt handler did may have been overwritten 940. If a concurrent interrupt has occurred, the test pointer is set to NULL and recv_test is set to zero 950. A valid pointer is returned, however, for the current peek or read operation, i.e., resetting of the test pointer to NULL only affects the next peek or read operation. Thereafter, peek or read processing is complete using the more complicated set of tests 960 and return is made to the peek operation flow of FIG. 5 or read operation flow of FIG. 6, depending upon the operation initially calling the more complicated set of tests.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of selecting an adapter of multiple adapters of a switch node for peeking or reading of a message, said method comprising:
   employing a first filter to initially test whether a previously used adapter of the multiple adapters should be used to peek or read a next message;
   if the first filter fails to select the previously used adapter, then employing a second filter to determine which adapter of the multiple adapters should be used to peek or read the next message; and
   wherein the first filter comprises a first test set, and wherein the second filter comprises a second test set, and wherein the second test set is more time consuming than the first test set.

2. The method of claim 1, wherein the first filter comprises a first test set comprising at least one of:
   determining whether a read is pending indicative that the next message in the previously used adapter has been peeked at; or
   determining that each of the following conditions is true:
      a message is available in the previously used adapter;
      a switch count indicates that the next message should be received from the previously used adapter; and
      the previously used adapter is currently operational.

3. The method of claim 1, wherein the second filter comprises determining whether the previously used adapter is down, and if so, selecting another adapter of the multiple adapters from a listing of the multiple adapters, wherein the another adapter has at least one message available for peeking or reading.

4. The method of claim 3, wherein upon selecting another adapter for peeking or reading of the next message, the method further comprises setting a switch_count variable to a number of messages that should be read before switching to a new adapter of the multiple adapters.

5. The method of claim 1, wherein the first filter includes decrementing a recv_test variable whenever a message is read from the previously used adapter, and wherein the second filter further comprises calculating a new value for a switch_count variable based upon how much recv_test has been decremented, and determining whether a message_count for the previously used adapter is greater than zero and the switch_count is greater than zero, and if both are so, then setting up to peek or read from the previously used adapter.

6. The method of claim 1, further comprising employing a recv_test variable, the recv_test variable being initialized when a switch is made to a new adapter as the lesser of a count of messages in the new adapter and a switch_count variable corresponding to a defined number of messages that should be read before switching to another adapter of the multiple adapters.

7. A system for selecting an adapter of multiple adapters of a switch node for peeking or reading of a message, said system comprising:
   means for employing a first filter to initially test whether a previously used adapter of the multiple adapters should be used to peek or read a next message;
   means for employing a second filter to determine which adapter of the multiple adapters should be used to peek or read the next message when the first filter fails to select the previously used adapter; and
   wherein the first filter comprises a first test set, and wherein the second filter comprises a second test set, and wherein the second test set is more time consuming than the first test set.

8. The system of claim 7, wherein the first filter comprises a first test set comprising at least one of:
   means for determining whether a read is pending indicative that the next message in the previously used adapter has been peeked at; or
   means for determining that each of the following conditions is true:
      a message is available in the previously used adapter;
      a switch count indicates that the next message should be received from the previously used adapter; and
      the previously used adapter is currently operational.

9. The system of claim 7, wherein the second filter comprises means for determining whether the previously used adapter is down, and if so, for selecting another adapter of the multiple adapters from a listing of the multiple adapters, wherein the another adapter has at least one message available for peeking or reading.

10. The system of claim 9, wherein upon selecting another adapter for peeking or reading of the next message, the system further comprises means for setting a switch_count variable to a number of messages that should be read before switching to a new adapter of the multiple adapters.

11. The system of claim 7, wherein the first filter includes means for decrementing a recv_test variable whenever a message is read from the previously used adapter, and wherein the second filter further comprises means for calculating a new value for a switch_count variable based upon how much recv_test has been decremented, and for determining whether a message_count for the previously used adapter is greater than zero and the switch_count is greater than zero, and if both are so, then for setting up to peek or read from the previously used adapter.

12. The system of claim 11, wherein if either the message_count variable is zero or the switch_count variable is zero, then the second filter comprises means for selecting another adapter having an available message from a list of adapters.

13. The system of claim 12, wherein the second filter further comprises means for determining whether a next adapter is found, and if not, then means for determining whether the message_count for the previously used adapter is zero, and again if not, then means for setting up to peek or read from the previously used adapter and for setting the switch_count variable to a number of messages that should be read before switching to another adapter.

14. The system of claim 7, further comprising means for employing a recv_test variable, the recv_test variable being initialized when a switch is made to a new adapter as the lesser of a count of messages in the new adapter and a switch_count variable corresponding to a defined number of messages that should be read before switching to another adapter of the multiple adapters.

15. At least one program storage device readable by a computer, tangibly embodying at least one program of instructions executable by the computer to perform a method of selecting an adapter of multiple adapters of a switch node for peeking or reading of a message, the method comprising:
   employing a first filter to initially test whether a previously used adapter of the multiple adapters should be used to peek or read a next message;
   if the first filter fails to select the previously used adapter, then employing a second filter to determine which adapter of the multiple adapters should be used to peek or read the next message; and wherein the first filter comprises a first test set, and wherein the second filter comprises a second test set, and wherein the second test set is more time consuming than the first test set.

16. The at least one program storage device of claim 15, wherein the first filter comprises a first test set comprising at least one of:
   determining whether a read is pending indicative that the next message in the previously used adapter has been peeked at; or
   determining that each of the following conditions is true:
      a message is available in the previously used adapter;
      a switch count indicates that the next message should be received from the previously used adapter; and
      the previously used adapter is currently operational.

17. The at least one program storage device of claim 15, wherein the second filter comprises determining whether the previously used adapter is down, and if so, selecting another adapter of the multiple adapters from a listing of the multiple adapters, wherein the another adapter has at least one message available for peeking or reading.

18. The at least one program storage device of claim 17, wherein upon selecting another adapter for peeking or reading of the next message, the method further comprises setting a switch_count variable to a number of messages that should be read before switching to a new adapter of the multiple adapters.

19. The at least one program storage device of claim 15, wherein the first filter includes decrementing a recv_test variable whenever a message is read from the previously used adapter, and wherein the second filter further comprises calculating a new value for a switch_count variable based upon how much recv_test has been decremented, and determining whether a message_count for the previously used adapter is greater than zero and the switch_count is greater than zero, and if both are so, then setting up to peek or read from the previously used adapter.

20. The at least one program storage device of claim 15, further comprising employing a recv_test variable, the recv_test variable being initialized when a switch is made to a new adapter as the lesser of a count of messages in the new adapter and a switch_count variable corresponding to a defined number of messages that should be read before switching to another adapter of the multiple adapters.

* * * * *